(12) United States Patent
Ytterborn

(10) Patent No.: US 9,994,145 B2
(45) Date of Patent: Jun. 12, 2018

(54) SOFTWARE APPLICATION PRODUCT, TRAFFIC SIGNALLING KIT AND METHOD FOR PERFORMING TRAFFIC SIGNALLING

(71) Applicant: POC SWEDEN AB, Stockholm (SE)

(72) Inventor: Stefan Ytterborn, Stockholm (SE)

(73) Assignee: POC SWEDEN AB, Stockholm (SE)

( * ) Notice: Subject to any disclaimer, the term of this patent is extended or adjusted under 35 U.S.C. 154(b) by 0 days. days.

(21) Appl. No.: 15/531,022

(22) PCT Filed: Nov. 26, 2015

(86) PCT No.: PCT/SE2015/051272
§ 371 (c)(1),
(2) Date: May 26, 2017

(87) PCT Pub. No.: WO2016/085398
PCT Pub. Date: Jun. 2, 2016

(65) Prior Publication Data
US 2017/0313238 A1 Nov. 2, 2017

(30) Foreign Application Priority Data
Nov. 27, 2014 (SE) ...................................... 1451437

(51) Int. Cl.
*B62J 3/00* (2006.01)
*B60Q 1/26* (2006.01)
(Continued)

(52) U.S. Cl.
CPC ............. *B60Q 1/2673* (2013.01); *B60Q 1/34* (2013.01); *B60Q 1/44* (2013.01); *B60Q 1/503* (2013.01); *B60Q 1/52* (2013.01); *B60Q 2900/30* (2013.01)

(58) Field of Classification Search
CPC .......... B60Q 1/2673; B60Q 1/34; B60Q 1/44; B60Q 1/503; B60Q 1/52; B60Q 2900/30
(Continued)

(56) References Cited

U.S. PATENT DOCUMENTS 6,091,956 A * 7/2000 Hollenberg ............ G06Q 30/02
455/456.5
6,269,304 B1 * 7/2001 Kaji .................... G01C 21/3658
342/70
(Continued)

FOREIGN PATENT DOCUMENTS

CN 202115632 U 1/2012
DE 202006019330 U1 4/2008
(Continued)

OTHER PUBLICATIONS

International Search Report from corresponding Intentional Patent Application No. PCT/SE2015/051272, dated Mar. 7, 2016.
(Continued)

*Primary Examiner* — Daryl Pope
(74) *Attorney, Agent, or Firm* — Tucker Ellis LLP

(57) ABSTRACT

A software application product executable on a mobile device (110) for traffic signalling using a screen (111) of the device (110), in combination with remote activation means (120,130) providing a user interface. The invention further relates to a pocket for accommodating the a device (110) during such signalling. The invention further relates to a kit comprising such a soft-ware application product and optionally such a pocket, as well as to a method for traffic signalling.

21 Claims, 6 Drawing Sheets

(51) Int. Cl.
    *B60Q 1/52*     (2006.01)
    *B60Q 1/34*     (2006.01)
    *B60Q 1/44*     (2006.01)
    *B60Q 1/50*     (2006.01)

(58) Field of Classification Search
    USPC .......... 340/539.1, 539.11, 539.13, 905, 928;
                             701/533, 428, 437, 458
    See application file for complete search history.

(56) References Cited

U.S. PATENT DOCUMENTS

| | | |
|---|---|---|
| 2003/0213045 A1 | 11/2003 | Fuentes |
| 2012/0206249 A1 | 8/2012 | Lee |
| 2013/0285802 A1 | 10/2013 | Juang |
| 2014/0268839 A1 | 9/2014 | Timmerberg |

FOREIGN PATENT DOCUMENTS

| | | |
|---|---|---|
| ES | 1172759 U | 12/2016 |
| WO | 2011061663 A1 | 5/2011 |
| WO | 2013150297 A1 | 10/2013 |
| WO | 2016024094 A1 | 2/2016 |
| WO | 2016088148 A2 | 6/2016 |

OTHER PUBLICATIONS

International Preliminary Report on Patentability from corresponding Intentional Patent Application No. PCT/SE2015/051272, dated May 30, 2017.

Extended European Search Report from corresponding European Application No. 15863403, dated Dec. 21, 2017.

\* cited by examiner

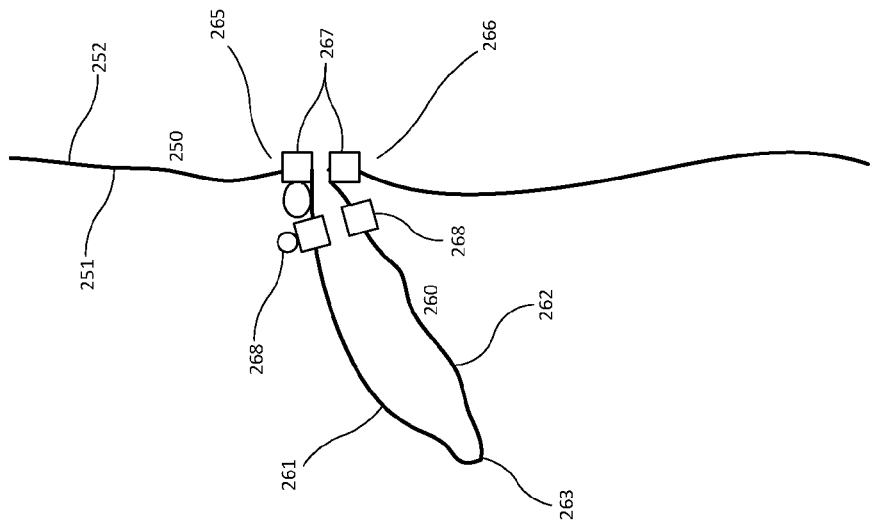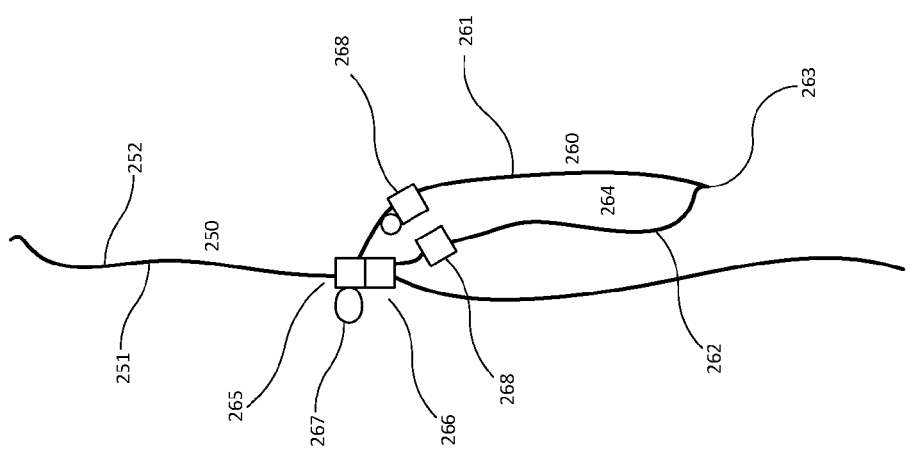

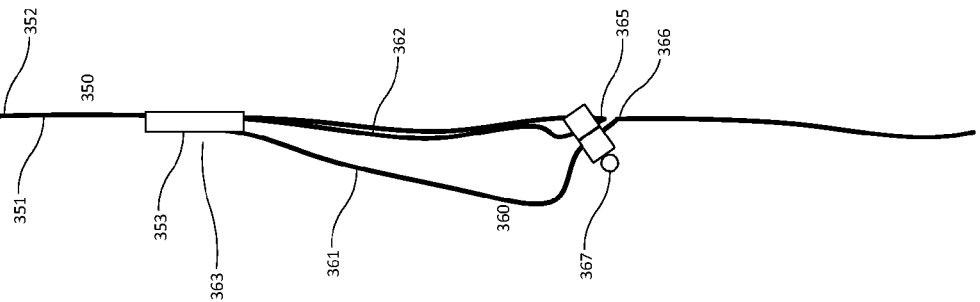
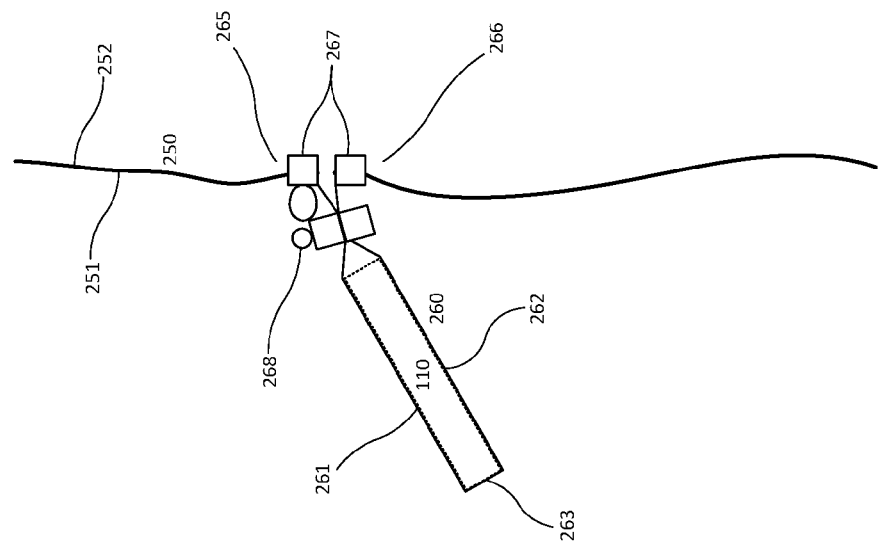

SOFTWARE APPLICATION PRODUCT, TRAFFIC SIGNALLING KIT AND METHOD FOR PERFORMING TRAFFIC SIGNALLING

The present invention relates to various aspects for performing visual traffic signalling. More precisely, the invention relates to a software application product and a pocket for use in a method for performing such traffic signalling, which method is also a part of the present invention. Moreover, the invention relates to a wearable article comprising such a pocket and a kit comprising such an article in combination with such a software application product executable on a mobile phone and possibly also a remote activation means.

Today, increasing numbers of people use bicycles, mopeds, motorcycles and so forth in densely trafficked areas, for instance for commuting. In particular when dark outside, there is a need for clarity in the visual communication with fellow road users, for security reasons.

There are many solutions for signalling to other road users the whereabouts and intentions of drivers of such vehicles. For instance, some mopeds have side turn signals, break lights and so forth, which are operable via controls on the handlebars. Cyclists conventionally use blinking or fixed lights facing backwards (red) and to the front (white) to indicate their presence and position in the street.

However, there is a need for simpler and better solutions in this field. Conventional LED or halogen lamps are quickly drained of their battery, and it is easy to forget to charge them before going out in traffic. This may lead to danger for the commuter. One alternative is to use an electrical generator (dynamo) powering a lamp. This, however, makes a bicycle more difficult to pedal.

Also, it would be advantageous for a more versatile and adaptable signalling device, which for instance automatically can adapt to varying operating conditions. Such devices are in general costly.

The present invention solves the above described problems.

Hence, the invention relates to a software application product arranged to be activated and executed on a mobile electronic device, which electronic device comprises a screen display, which software product is arranged to, when executed, display graphical signalling information on the said screen display, which signalling information is arranged to be visible to other road users when the electronic device is fastened to a user or on the user's vehicle with the display screen visible to other road users, wherein the software product is arranged to detect an activation signal which is incoming to the electronic device via an interface comprised in the electronic device, which signal originates in a remote activation means, arranged to communicate with the electronic device and arranged to allow the user to activate the remote activation means without touching the electronic device and to communicate the activation signal to the electronic device via the interface and in a way which is detectable to the software product, and wherein the software product is arranged to change the visible state of the signalling information from a base state to an activated state as a reaction to said detection.

The invention also relates to a pocket for a wearable article such as a garment, a backpack or a belt, which pocket comprises a first flexible pocket side and a second flexible pocket side together forming the pocket, which pocket is furthermore fastened to the article along an attachment line and can be reversed so that the interior of the pocket protrudes from the article with the first side exposed, wherein the pocket is of a size and shape suitable for completely accommodating a mobile telephone, and wherein the said first pocket side is at least partly transparent, such that a screen display of the mobile phone can be read through the exposed first pocket side when the mobile phone is accommodated in the reversed pocket.

The invention further relates to a kit comprising such a software application product and optionally such a pocket, as well as to a method for traffic signalling.

In the following, the invention will be described in detail, with reference to exemplifying embodiments of the invention and to the enclosed drawings, wherein:

FIGS. 2a-3c are respective side section views of a garment comprising a first exemplifying pocket according to the invention in three different states;

FIG. 3 is a side section view of a garment comprising a second exemplifying pocket according to the invention;

All figures share the same reference numerals for the same or corresponding parts. In addition thereto, the first digit in each reference number denotes the figure number, and the last two digits are shared among different figures for corresponding parts.

The present invention relates to a number of interacting parts, which parts interact to produce a system and a kit according to the invention, jointly and individually achieving the advantages described herein.

One first such part is a software application product arranged to be activated and executed on a mobile electronic device comprising a screen display. A "mobile electronic device" in the sense used herein refers to a portable device of programmable, general-purpose type, comprising a central processing unit, a RAM memory and a screen display, which device is capable of executing a software application coded by a piece of programming or binary code which is loaded into the memory of the device. Examples include portable media players, such as an iPod®, and "smartphone" mobile telephones. The software application can be a native application, locally installed on the device, or be run in, for instance, the context of a web browser using HTML5, wherein certain functionality may be provided in the context of a web service or the like, from an external server. This is conventional as such, and such a server is not shown in the figures. What is important is that the software function is executed on, from or via the device 110 so that the physical visual appearance on the physical local screen display of the device is updated as a result thereof.

Figure 1A:
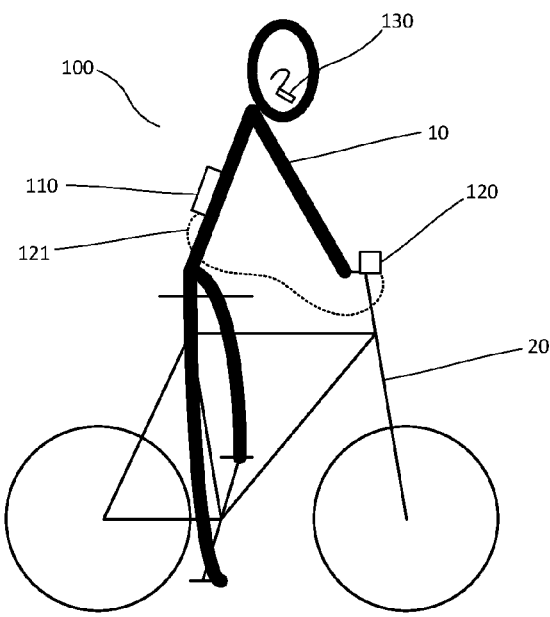
FIG. 1a is an overview of two exemplifying systems according to the present invention as used on a bicyclist user.

FIG. 1a illustrates a system 100 in which such an electronic device 110 is used together with a remote activation means 120 or 130, arranged to communicate with the device 110 using a cable 121 or alternatively using a standard wireless local/nearfield communication protocol, such as Bluetooth® or WiFi. The device 110 is attached to and used on a user 10, such as a commuter, which user 10 is present in traffic transported on or by a vehicle 20, such as a bicycle, a moped or a motorbike. The device 110 may also be attached directly to the vehicle 20. The means 120 is fastened to the handlebar on the bicycle for manual handling by the hands of the user 10. The exemplifying means 130 is arranged close to the user's 10 mouth, in a conventional way such as being attached around the user's ear, for recording and registering voice commands. It is realized that it is sufficient to use one of means 120 or 130 (or 140, see below).

Figure 1B:
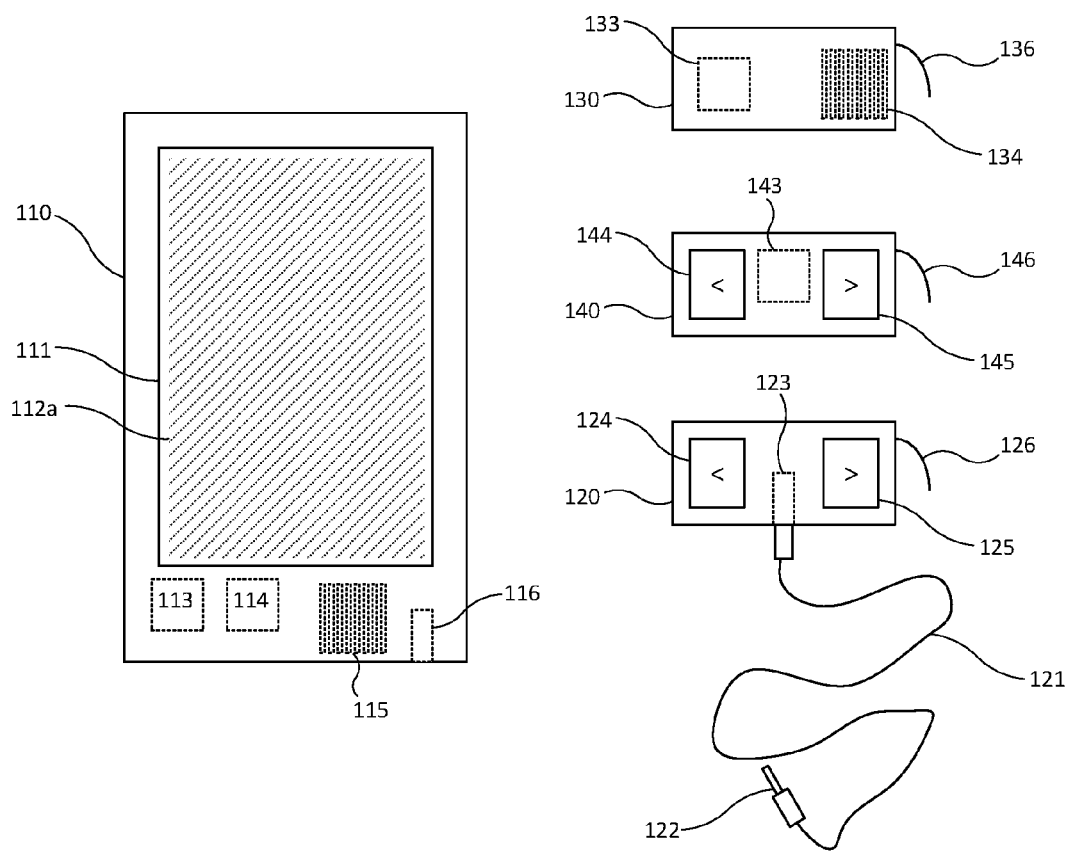
FIG. 1b illustrates a mobile phone executing a software application product according to the invention in a first visual information signalling state, along with three different exemplifying remote activation means according to the invention.

FIG. 1b illustrates the device 110 from the front, together with a number of different exemplifying remote activation means 120, 130, 140, also shown in respective more detailed front views. As can be seen from FIG. 1b, the device 110 comprises a screen display 111, preferably a standard, full-colour raster image display 111; a standard wireless communication circuit 113, such as a Bluetooth® or WiFi circuit, for communicating with the locally arranged remote activation means 120, 130 or 140; a conventional motion and/or position and/or posture sensor 114, such as any combination of MEMS accelerometers, gyros, geolocation and compasses, for measuring position, posture and/or rotation of the device 110 as well as position, posture and/or rotation velocities and/or accelerations thereof; a microphone 115 and/or a standard analogue female headphone socket, such as an RCA jack, all depending on the intended use of the device 110 in the context of the present invention. It is noted that mobile electronic devices of the type described herein are today available to many users in the form of standard smartphones.

According to the invention, the said software product is arranged to, when executed on, from or via the device 110 as described above, display graphical signalling information on the said screen display 111, which signalling information is visible to other road users when the electronic device 110 is fastened to a user 10 or on a user's 10 vehicle 20 with the display screen 110 visible to other road users. One example of such mounting is illustrated in FIG. 1a, where the device 110 is fastened to the back of the user 110 with the screen 111 facing away from the user 10, for instance using a pocket according to the invention, as described below, or using any other suitable type of fastening means allowing the display 111 to be visible to other road users behind the user 10. It is realised that the device 110 in other embodiments may be mounted with its display 111 visible from the front of the user 10 instead, such as on the user's chest or on a handlebar of a vehicle.

In FIG. 1b, the said graphical signalling information is exemplified by a large rectangle 112a (shown in dashed lines in FIG. 1b for clarity reasons), which rectangle 112a preferably covers essentially the whole, or at least the majority, of the screen 111. For instance, a brightly coloured red rectangle can serve as a back- or break light for the user 10 on the vehicle 20. Below, several examples of signalling are provided.

According to the invention, the software product is arranged to detect an activation signal which is incoming to the electronic device 110 via an interface comprised in the electronic device 110 and which signal originates in the said remote activation means 120, 130, 140. The latter is in turn connected to the electronic device 110 via said interface, and is arranged to allow the user 10 to activate the remote activation means 120, 130, 140 without touching the electronic device 110 such that the activation signal is communicated by the means 120, 130, 140 to the electronic device 110 via the interface and in a way which is detectable to the software product on the device 110.

The exemplifying remote activation means 120 comprises an analogue audio connection, such as a permanently attached audio cable 121, alternatively a female audio socket 123 such as an RCE jack, to which an audio cable 121 can be connected. A connector 122 of such a cable 121 is arranged to be connected, such as by insertion, to the socket 116.

The exemplifying remote activation means 130 and 140, on the other hand, comprise respective wireless communication means 133 and 143, respectively, arranged to communicate with the means 113 as described above.

Hence, the said "interface comprised in the device 110" is exemplified by either a wired interface 116 in cooperation with 123, 121 and 122; or a wireless interface 113 in cooperation with 133 or 143. It is realised that the means 120, 130, 140 are shown for exemplifying purposes, and that for instance the means 130 may also comprise a wired analogue audio device 116 connection.

As a matter of fact, it is preferred that the said interface is a standard wireless connection 113 which is supported by the electronic device 110, such as a Bluetooth® or WiFi connection, or a headset audio cable 122 connection 116. A wired or wireless USB connection may also be used, or any other suitable wired or wireless communication standard supported by the device 110.

As a less preferred option, the microphone 115 may be used for direct sound input by the user 10.

In FIG. 1b is also illustrated that each different remote activation means 120, 130, 140 comprises a respective user interface arranged to be activated by the user 10, in particular arranged for allowing the user 10 to initiate certain actions, and arranged to, in reaction to such user activation, send a signal, such as said activation signal, to the device 110 via the said interface. The software product, in turn, is then arranged to detect the user activation by detecting the reception of said signal in the device 110. Then, the software product can take appropriate action, as described below.

By way of example, the remote activation means 120 comprises a "left" button 124 and a "right" button 125, arranged to, when pressed by the user 10, send a respective activation signal to the device 110, over said interface, signifying either an intended left or right turn. The means 130 comprises corresponding buttons 144, 145.

As another example, the remote activation means 130 instead comprises a microphone 134, arranged to read a sound uttered by the user 10, such as a voice command. Then, an activation signal, or a raw, non-interpreted analogue signal, is sent upon the detection of such signal.

In particular, when the separate electronic device of the remote activation means 130 comprises a microphone 134, it is either arranged to send an analogue audio signal via a headset audio cable, such as 121, to the electronic device 110, or to digitally record a sound, such as uttered by the user 10, and then to either send the recorded sound digitally to the electronic device 110 via a cable 121 or wirelessly, over a suitable digital interface, or to first apply a sound recognition algorithm in the separate electronic device itself and then to send to the electronic device 110 digital data representing information carried by the recorded sound. For instance, the means 130 may comprise a processor running a conventional sound recognition algorithm with the aim of matching a recorded sound to a certain one of a predetermined set of word commands recognized by the system 100. In the alternative case in which the raw sound is sent to the device 110, as opposed to interpreted data, the software product may comprise such a sound recognition algorithm. Such algorithms are conventional as such, and are not described in detail herein. What is important is that a voice command uttered by the user 10 is recorded and then interpreted by either the means 130 and/or the device 110.

Each activation means 120, 130, 140 may further comprise a respective fastening means 126, 136, 146 for fastening the respective means 120, 130, 140 on the user 10 or on the vehicle 20 at a distance from the device 110. Such fastening can be conventional as such, and are only indicated very coarsely in FIG. 1b.

According to the invention, the software product is further arranged to change the visible state of the signalling information from a base state 112a to an activated state 112b as a reaction to the detection of said activation signal.

Figure 1C:
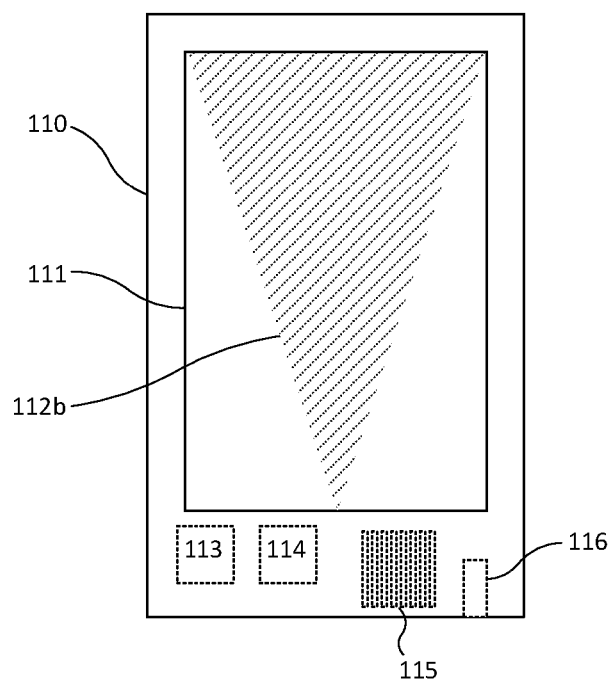
FIG. 1c illustrates the mobile phone of FIG. 1, but in a second visual information signalling state.
Figure 1D:
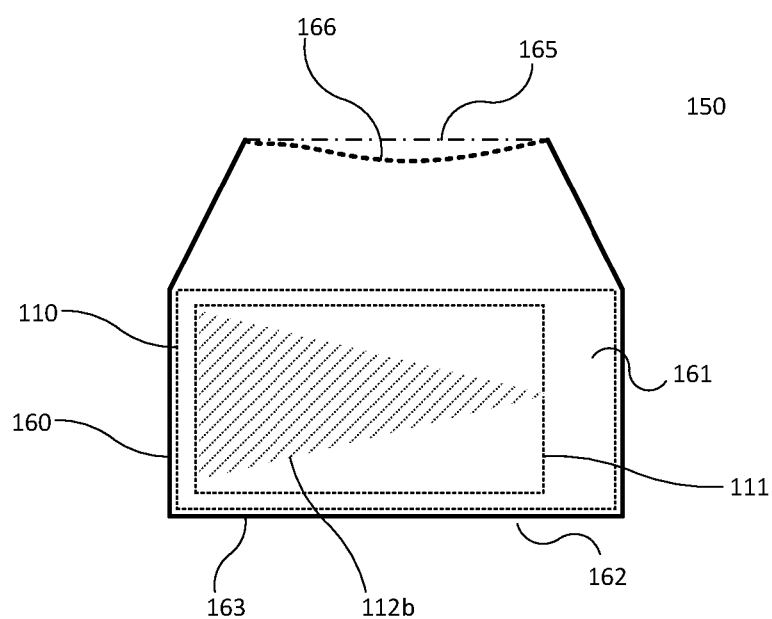
FIG. 1d illustrates the mobile phone of FIG. 2 in a pocket according to the invention as seen from the back of a user wearing a garment comprising the pocket.

This is exemplified in FIG. 1c, wherein a field 112b, in the form of an arrow (in FIG. 1c pointing downwards, but when the device 110 is placed on the user 10 or the vehicle 20 preferably pointing to the left or right, such as is shown in FIG. 1d) is shown. It is understood that the electronic device 110, in particular in case the device 110 is a mobile phone, can be oriented with the screen 111 in a portrait or landscape posture. This can be selected freely, for instance by selecting a corresponding shape for the pocket 160 (see below). In one preferred embodiment, the software product is arranged to automatically sense the posture of the device 110, using sensors 114, and to automatically adapt the displayed signalling information to the detected posture.

In this preferred example, the said base state hence comprises a graphical field 112a of a particular colour, and the activated state comprises a graphical field 112b arranged to signal an anticipated change of motion of the user 10 or the user's 10 vehicle 20. In particular, the field 112a may be blinking or providing a steady light, such as a red light functioning as a back light when the user 10 moves in traffic. The field 112b may preferably also be blinking, but may also provide a steady light, with a colour selected among red, yellow or orange in order to make a visual appearance similar to a conventional side turn signal.

Hence, in the particular preferred case in which the anticipated change of motion is a turn, the activated state 112b comprises an arrow indicating the anticipated turning direction. This means that the user 10 may indicate, via the remote activation means 120, 130, 140, either a right turn or a left turn, such as by pressing the corresponding button 124, 144 or 125, 145, or by uttering the word "left" or "right" into the microphone 134.

According to a preferred embodiment, the software product is furthermore arranged to read data from at least one sensor 114 of the above described type, comprised in the electronic device 110. Preferably, the reading is performed continuously during use, and monitored for predetermined patterns of motion such as rapid accelerations (indicating breaking), very rapid accelerations (indicating an accident), sideways acceleration changes (indicating the beginning or ending of turns, in particular in combination with appropriate measures of instantaneous posture of the electronic device), and so forth.

Hence, such sensor data is preferably used to continuously interpret the instantaneous traffic situation and to take appropriate action once any one of a set of predetermined situations have been detected by a predetermined respective set of parameters fulfilling a predetermined respective set of conditions.

Also, it is preferred that the motion sensor 114 also comprises a geolocation sensor, such as a GPS (Global Positioning System), and/or a MEMS compass, data from which may be used in combination with the other sensor data.

The software product is arranged to take such appropriate action by automatically changing the state of the signalling information as a reaction to said certain predetermined information read from said at least one sensor 114. This is preferably performed in addition to the said state change as a reaction to the said detected user activation using the remote activation means 120, 130, 140. In particular, it is preferred that at least one specific predetermined action performed as a consequence of sensor 114 data detection, preferably several or all such actions, takes precedence over manual input from the user 10, as is exemplified below.

In one example, the said predetermined information from sensor(s) 114 is an indication of retardation of a certain minimum magnitude of the electronic device 110. Such retardation may, for instance, either be an indication of any acceleration of a certain minimum magnitude, or, in more elaborate embodiments, take into consideration the intended or read posture of the device 110 on the user 10 or the vehicle 20. Upon such detection, it is preferred that the software function changes the signalling information on the screen 111 to a visual representation of a break light, such as a stable red light, in reaction to the reading by the software product of the said information indicating a retardation. Such visual representation may for instance involve changing the rectangle of the base state 112a from a duller red light to a brighter red light. When the retardation ends, it is preferred that the software product again changes the signalling information back to the base state, or to whatever state prevailed before the change to the break light representation.

In another example, the said predetermined information is an indication of a transition between a turning and a non-turning motion state of the electronic device 110. Then, the signalling information is changed to the said base state in reaction to the reading by the software function 110 of the said information in case the current state of the signalling information currently comprises a field 112b arranged to signal an anticipated change of motion of the user 10 or the vehicle 20. In other words, when the user 10 has indicated an anticipated turn, such as a right turn, the arrow 112b is displayed. The turn is initiated, during which the arrow 112b is still displayed. When the software function detects, via the sensor(s) 114 of the electronic device 110 and suitable algorithmic processing of the sensor 114 information, that the right turn ends, the rectangle 112a is instead displayed on the screen 111. Hence, the result is an automatic switch-off of side-turn signal functionality.

Many other examples can be envisioned. For instance, upon a detected crash or other accident, a bright white or yellow, quickly blinking warning light can be displayed, possibly with emergency information, such as the name and social security number of the user 10 (as previously entered by the user 10).

Also, the remote activation means 120, 130, 140 may be arranged to read a user 10 command indicating an anticipated breaking, in which case a break light indication may be displayed on the screen 111 as describe above, which break light indication may be removed from the screen 111 once the end of the breaking action is detected by the software application based upon sensor 114 data.

It is furthermore preferred that the software function is arranged to automatically calibrate the received sensor data based upon specific knowledge about the situation in which the device 110 is used. Such calibration may preferably be performed upon initiation of the software application at the outset of each voyage with the vehicle 20, and may preferably also be performed automatically continuously or intermittently to achieve a dynamically responsive and accurate calibration.

For instance, the software application may record and note periods of relatively low accelerations and interpret such periods as vehicle 20 standstill, and may calculate a stationary posture of the device 110 in relation to the user 10 and/or vehicle 20 as an average of postures recorded by accelerometer 114 data during such standstill periods.

Another example is to compare relatively slowly-updating GPS location data with relatively quickly-updating sideways acceleration data in order to estimate the turning amount resulting from a particular sideways acceleration at a particular velocity. Such estimation can then be used as a basis for a quick-response reading of the tuning amount using acceleration data, for instance to determine a threshold value for the beginning or ending of a turn.

It is also preferred that the sensor 114 comprises a compass, data from which is also preferably used for detection of predetermined traffic situations, as described above, and/or for calibration purposes. For instance, when the compass direction turns more quickly than a predetermined number of degrees per second while accelerometer data indicates that a turn is ongoing, initiating or ending, this may indicate that the user 10 turns his or her torso rather than the vehicle 20 bring turned, why a change of signalling information can be avoided. Calibration using compass data can be performed in a way similar to GPS-based calibration as described above.

It is noted that in all these examples, built-in hardware components of the electronic device 110 are used for automatically producing or modifying the visual signalling information, without any manual user input.

As exemplified above by buttons 124, 125, 144, 145 and, in the alternative, voice recognition functionality using remote activation means 130, the system is capable of recognizing particular predetermined user 10 commands ("left" and "right", respectively). It is realized that additional such commands may be supported in addition to "left" and "right". One example is a "stop" command, implemented as a corresponding button in a remote activation means 120 or 140 and/or as a supported voice command "stop". Upon the user 10 giving such command via a remote activation means, the software product is preferably arranged to change the signalling information from a, preferably red, blinking light to a steady light. Similarly, the user 10 giving a supported (by a button and/or voice recognition) command "go" will again cause the software product to change the signalling information to a blinking light. Alternatively, the blinking light may be displayed again when the software product detects a forward motion, based upon data from sensors 114 as described above.

Another example is a supported (by a button on a remote activation means 120, 130, 140 and/or voice recognition) command "back", which returns to a previously shown state of the signalling information on the screen 111. It is preferred that the command "back" will always cause the software application to display the base state 112*a* on the screen 111, irrespectively of the currently displayed state on the screen 111.

A second interacting part according to the present invention is a pocket for a wearable article such as a garment, a backpack or a belt. Such a pocket 160 in a piece of garment 150 such as a jacket or shirt is shown in FIG. 1*d*, from the front, and another example of such a pocket 260 is illustrated in FIG. 2*a*, from the side in a section view. The article 250 has an outer 251 and an inner 251 side of its fabric.

According to this aspect of the invention, the pocket 160, 260 comprises a first flexible pocket side 161, 261 and a second flexible pocket side 162, 262, that together form the pocket 160. The respective sides 161, 261 and 162, 262 are joined at a distant joining line 163, 263.

The pocket 160, 260 is furthermore fastened to the article 150, 250 along a proximate attachment line 165, 166; 265, 266, which preferably describes a closed loop. The dash-dotted line in FIG. 1*d* indicates a folding/attachment line 165, the dotted line indicates a hidden folding/attachment line 166.

The pocket 160, 260 can be reversed, so that the interior 264 of the pocket 160, 260 protrudes from the article 150, 250 with the first side 161, 261 exposed. In the case in which the pocket 260 features a zip-fastener 267 or the like for closing the pocket 260, this must first be unzipped or opened before the pocket 260 can be reversed. The reversed state of the pocket 260 is illustrated in FIG. 2*b*, in which it is also clear that the zip-fastener 267 has been opened.

It is preferred that the pocket 160, 260 is of a size and shape suitable for completely accommodating the electronic device 110, and in particular an electronic device 110 in the form of a conventional mobile telephone. Preferably, the pocket 160, 260 is arranged to accommodate such a mobile phone in a way so that the mobile phone cannot shift its general orientation inside the pocket 160, 260 when accommodated therein. Herein, "to shift its general orientation" means changing between a substantially vertical and a substantially horizontal posture; and preferably also encompasses a shift between a substantially landscape and a substantially portrait orientation of the screen 111. This property of the pocket 160, 260 can be achieved in various ways, preferred ones comprising providing a snug fit around the accommodated, preferably landscape- or portrait oriented and vertically postured, mobile phone 110 (as is illustrated schematically in FIG. 1*d*); and providing an adjustable strap or the like (not shown in the figures) which can be tightened around the accommodated mobile phone 110 in a desired orientation, and which attaches to the garment 150, 250. It is noted that, since different mobile phone models have different dimensions and shapes, it may be so that the size, dimensions and shape of the pocket is specifically adapted for a particular mobile phone model, model series or type of mobile phone. In general, it is preferred that the flat pocket 160, 260 is not larger than 20 cm by 10 cm.

According to the invention, the first pocket side 161, 261 is at least partly transparent, such that the screen display 111 of the mobile phone 110 is visible and can be read through the exposed first pocket side 261 when the mobile phone 110 is accommodated in the reversed pocket.

Such a pocket 160, 260 provides a very simple yet powerful way of providing an attachment means for an electronic device 110 of the above described type, running a software function according to the present invention, at a location on the body of a user 10 at which a desired functionality in terms of visual signalling information display on the device 110 screen 111 is to be performed. There is no need for special fastening devices for the device 110, and the pocket 160, 260 can be used as a normal pocket when not used as a component part of the system 100, by simply re-reversing it back into the article 150, 250. Furthermore, the localization of the pocket 160, 260 outside of the article 150, 250 is particularly beneficial with respect to moisture control and the like, as is explained in the following.

According to a preferred embodiment, which is illustrated in FIG. 2*b*, the pocket 260 is arranged to hang downwards from the said attachment line 265, 266 when reversed. This provides motion stability of the accommodated device 110 as well as a certain natural play between the body of the user 10 and the pocket 260, allowing air to enter in the space between the second side 262 and the outside 251 of the article 250 fabric.

In particular, it is preferred that at least the second pocket side 262, preferably the first side 261 also, even more preferably the whole pocket 260 structure, is waterproof, at least from the exterior of the pocket 260 and the article 250 when the pocket is reversed. This will result in a moist-free environment for the accommodated device 110.

In order to further increase the protection of the device 110 from the elements, and from bodily moisture of the user 10, in a preferred embodiment which is illustrated in FIGS. 2*a*-2*c*, the pocket 260 furthermore comprises a closing means 268, such as a zip-fastener, accessible from the exterior of the reversed pocket 260 as illustrated in FIG. 2*b* or 2*c* (and hence from the interior of the non-reversed pocket 260, as illustrated in FIG. 2*a*). The closing means 268 is arranged to removably seal the accommodated mobile telephone 110 in the reversed pocket 260. This state is illustrated in FIG. 2*c*.

Preferably, the closing means 268 is a zip-fastener with a handle arranged inside the pocket 260 when the pocket 260 is not reversed, such as is shown in FIG. 2*a*.

As mentioned above, the first side 161, 261 is at least partially transparent, such that the screen 111 of an accommodated device 110 is visible from outside of the pocket 160, 260. This may, for instance, be achieved by the first side 161, 261 being made from a transparent plastic material, or by part of the first side 161, 261 wall being constituted by an insertion of transparent plastic material in an otherwise opaque material, such as opaque textile material. It is in general preferred that the article 150, 250 as such is not transparent, but opaque, and preferably made from textile/woven material. The second side 162 is preferably also opaque.

According to a preferred embodiment, the first pocket side 261 is made from or comprises a material area made from transparent but coloured material, such as transparent but coloured plastic material. Such a pocket 160, 260 with a transparent but coloured first side 161, 261 is preferably combined with a software application function arranged to adapt the colouring of the displayed signalling information to cooperate with the colouring of the transparent first side 161, 261 material in order to achieve a desired effect. For instance, transparent red plastic may be combined with a software function providing white-coloured geometric patterns on the screen 111, thereby creating red geometric signalling patterns visible on the user's 10 body. This may provide better total brightness for particular colours, which alleviates potential problems with low maximum screen 111 brightness of certain mobile phones 110.

As an alternative to transparent material such as transparent plastic material, a sparsely woven textile material can be used to achieve the said transparency of the first side 161, 261. This may be combined with a plastic foil or the like, to achieve a potentially desired waterproofness as discussed above. Furthermore, the colouring of the transparent material may be achieved by producing the sparse threads from a coloured material.

FIG. 3 illustrates an alternative to allowing the pocket 160, 260, in which latter pockets 160, 260 the accommodated mobile phone 110 is arranged to hang downwards. In FIG. 3, the article 350 comprises a fastening means 353, such as a button, arranged to engage with a corresponding fastening means arranged at or near the jointing 363 between the first 361 and the second 362 sides of the pocket 360. This way, the pocket 360 can be folded away from the line 365, 366 in any desired direction, such as upwards (as illustrated in FIG. 3), and then be fixed in this position using the button 353.

Figure 4:
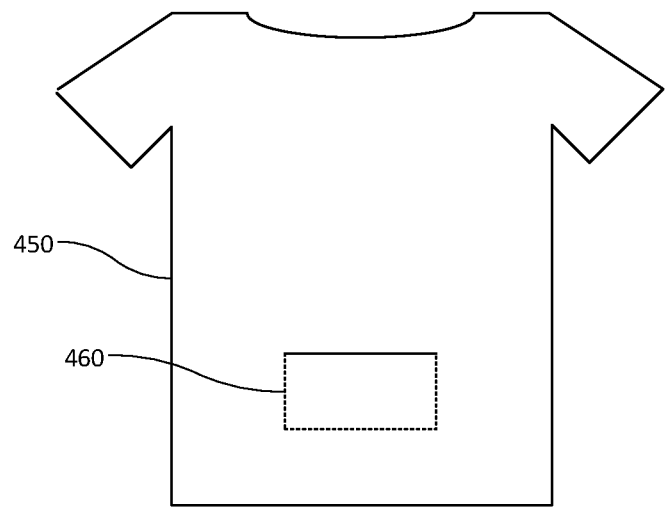
FIG. 4 illustrates a garment with a pocket according to the invention.
Figure 5:
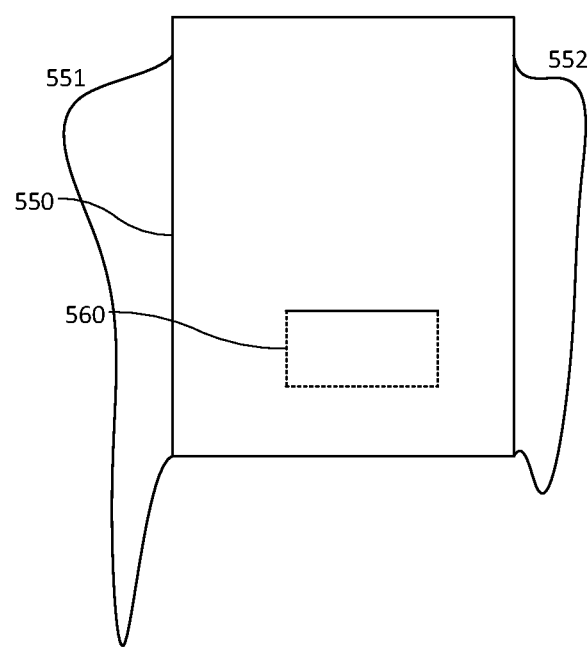
FIG. 5 illustrates a backpack with a pocket according to the invention.
Figure 6:
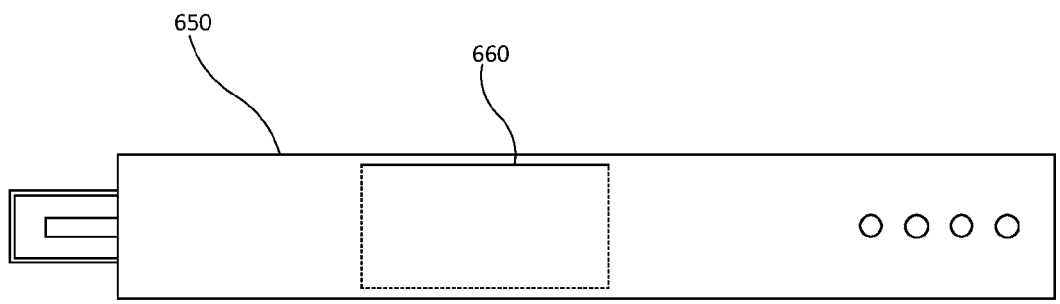
FIG. 6 illustrates a belt with a pocket according to the invention.

FIGS. 4, 5 and 6 illustrate respective wearable articles according to the invention as exemplified by, in order, a garment 450 in the form of a t-shirt, comprising a pocket 460 according to the present invention; a backpack 550, comprising a carrying system 551, 552 as well as a pocket 560 according to the present invention; and a belt 650 comprising a pocket 660 according to the present invention. These figures serve to illustrate the many various ways in which a pocket according to the present invention can be integrated into a wearable article and serve the above-described purposes and still provide the conventional benefits of a pocket, such as for carrying and storing items; as a decorative detail, and so on.

Hence, the invention encompasses, in cooperating aspects, the above described software function, executable on an electronic device, as well as the above described pocket, preferably as a part of a wearable article as described above. The above described remote activation means also constitutes such an aspect.

A kit according to the invention comprises:

A wearable article 150, 250, 350, 450, 550, 650 as described above, comprising a reversible pocket 160, 260, 360, 460, 560, 660 of the above-described type;

A software application product as described above, which can be executed on, from or via an electronic device 110 in the form of a mobile telephone.

In particular, in this case the software application product can be activated on the electronic device 110, which in turn can be placed in the reversed pocket 160, 260, 360, 460, 560, 660, with a screen display 111 of the electronic device 110 facing the said first pocket side 161, 261, 361, and so that it can be controlled by a remote activation means 120, 130, 140 as described above, and display graphical signalling information 112*a*, 112*b* which is visible to road users through the said transparent first side 161, 261 of the pocket 160, 260, 360, 460, 560, 660.

In particular, in such a kit the graphical signalling information 112*a*, 112*b* comprises a white-coloured field, and the first pocket side 161, 261 is made from transparent but coloured material so that the graphical signalling information 112*s*, 112*b* appears to be coloured in another colour than white, such as described above.

In particular, such a kit also comprises the remote activation means 120, 130, 140 as such.

In an alternative embodiment, a kit according to the invention comprises the said software application product and the said remote activation means, but not the said pocket.

The invention furthermore relates to a method for performing traffic signalling using a system 100 as described above, wherein the above-described software application product is activated and executed on, from or via the above-described electronic device 110 in the form of a mobile telephone. The electronic device 110 is preferably placed in the above-described reversible pocket 160, 260, 360, 460, 560, 660, in a wearable article 150, 250, 350, 450, 550, 650 as described above, with a screen display 111 of the electronic device 110 facing the first side 161, 261 of the pocket 160, 260, 360, 460, 560, 660. The article 150, 250, 350, 450, 550, 650 is preferably worn by a user 10 who is transported on or by a vehicle 20. Alternatively, the device 110 is fastened to the user 10 or the vehicle 20 in an alternative way. The user 10 performs said traffic signalling by activating the remote activation means 120, 130, 140 so that the electronic device 110 performs visual signalling, preferably through the said transparent first side 161, 261 of the pocket 160, 260, 360, 460, 560, 660. Preferably, all the above described methods of automatically and/or manually providing relevant such signalling information can be used in such a method.

Above, preferred embodiments have been described. However, it is apparent to the skilled person that many modifications may be imparted to the described embodiments without departing from the basic idea of the invention.

For instance, the electronic device 110 may be fastened to the user 10 or the vehicle 20 in other ways than using the said pocket 160, 260, 360, 460, 560, 660, such as on a conventional rigid holder.

Moreover, further methods of deducing information manually or automatically, via the activation means 120, 130, 140 and/or sensors 114, may be used for producing relevant signaling information. For instance, a light detector comprised in sensors 114, or a clock in the device 110, may be used to determine whether or not to activate the visual signaling (in case daylight conditions makes the graphics 112a, 112b difficult to see due to inadequate screen 111 brightness it may be preferred to only use the visual signaling when dark or dusk outdoors).

Hence, the invention is not to be considered limited to the described embodiments, but can be varied within the scope of the enclosed claims.

The invention claimed is:

1. Software application product stored by a non-transitory computer readable medium and arranged to be activated and executed on a mobile telephone, which mobile telephone includes a display screen, which software product is arranged to, when executed, display graphical signalling information on the screen display, which signalling information is arranged to be visible to other road users when the mobile telephone is fastened to a user or on a user's vehicle with the display screen visible to other road users, wherein the software product is arranged to detect an activation signal which is incoming to the mobile telephone via an interface comprised in the mobile telephone, which signal originates in a remote activation means, arranged to communicate with the mobile telephone and arranged to allow the user to activate the remote activation means without touching the mobile telephone and to communicate the activation signal to the mobile telephone via the interface and in a way which is detectable to the software product, and wherein the software product is arranged to change a visible state of the signalling information from a base state to an activated state as a reaction to a detection of the activation signal.

2. Software application product according to claim 1, wherein the base state comprises a graphical field of stable or flashing colour, and wherein the activated state comprises a graphical field arranged to signal an anticipated change of motion of the user or the user's vehicle.

3. Software application product according to claim 2, wherein the anticipated change of motion is a turn, and wherein the activated state comprises an arrow indicating an anticipated turning direction.

4. Software application product according to claim 1, wherein the interface is a standard wireless connection supported by the mobile telephone, such as a Bluetooth or NFC connection, or a headset audio cable connection.

5. Software application product according to claim 4, wherein the remote activation means comprises a separate mobile telephone, arranged with a user interface arranged to be activated by the user and, in reaction to such user activation, send a signal via said interface to the mobile telephone, and wherein the software product is arranged to detect the user activation by detecting reception of said signal.

6. Software application product according to claim 5, wherein the separate mobile telephone comprises a microphone, and wherein the separate mobile telephone is either arranged to send an analogue audio signal via a headset audio cable to the mobile telephone, or that the separate mobile telephone is arranged to digitally record a sound and then to either send the recorded sound digitally to the mobile telephone or to apply a sound recognition algorithm in the separate mobile telephone and to send to the mobile telephone digital data representing information carried by the recorded sound.

7. Software application product according to claim 1, wherein the software product is furthermore arranged to read data from at least one motion and/or posture and/or geolocation sensor comprised in the mobile telephone, and wherein the software product is arranged to automatically change the visible state of the signalling information as a reaction to certain predetermined information read from said at least one sensor, in addition to the state change as a reaction to the detected user activation.

8. Software application product according to claim 7, wherein the predetermined information is an indication of retardation of a certain minimum magnitude of the mobile telephone, and wherein the signaling information is changed to a visual representation of a break light, such as a stable red light, in reaction to the reading by the software product of the predetermined information.

9. Software application product according to claim 7, wherein the predetermined information is an indication of a transition between a turning and a non-turning motion state of the mobile telephone, and wherein the signalling information is changed to the base state in reaction to the reading by the software function of the predetermined information in case the current state of the signalling information currently comprises a field arranged to signal an anticipated change of motion of the user or the user's vehicle.

10. Traffic signalling kit comprising a software application product according to claim 1, which can be executed on, from or via a mobile phone, wherein the kit further comprises the remote activation means.

11. Traffic signalling kit according to claim 10, wherein the kit further comprises a wearable article, such as a garment, a backpack or a belt, which article comprises a back pocket, which pocket comprises a first flexible pocket side and a second flexible pocket side together forming the pocket, which pocket is furthermore fastened to the article along an attachment line and can be reversed so that an interior of the pocket protrudes from the article with the first pocket side exposed, wherein the pocket is of a size and shape suitable for completely accommodating the mobile telephone, and wherein the first pocket side is at least partly transparent, such that a screen display of the mobile phone can be read through the exposed first pocket side when the mobile phone is accommodated in the reversed pocket, and wherein the mobile phone can be controlled by the remote activation means and display graphical signalling information which is visible to road users through the first pocket side.

12. Traffic signalling kit according to claim 11, wherein the pocket is arranged to accommodate the mobile phone in a way so that the mobile phone cannot shift its general orientation inside the pocket when accommodated therein.

13. Traffic signalling kit according to claim 11, wherein the pocket is arranged to hang downwards from the attachment line when reversed.

14. Traffic signalling kit according to claim 11, wherein the second pocket side is waterproof.

15. Traffic signalling kit according to claim 11, wherein the pocket comprises a closing means accessible from an exterior of the reversed pocket, arranged to removably seal the accommodated mobile telephone in the reversed pocket.

16. Traffic signalling kit according to claim 15, wherein the closing means is a zip lock with a handle arranged inside the pocket when the pocket is not reversed.

17. Traffic signalling kit according to claim 11, wherein the first pocket side is made from transparent but coloured material, or comprises a piece of material which is transparent but coloured.

18. Traffic signalling kit according to claim 17, wherein the material is a plastic material or a sparsely woven textile material with coloured threads.

19. Traffic signalling kit according to claim 17, wherein the graphical signalling information comprises a white-coloured field, and wherein the transparent but coloured material is arranged to cause the graphical signalling information to appears to be coloured in another colour than white.

20. Method for performing traffic signalling, wherein a software application product according to claim 1 is activated and executed on, from or via the mobile telephone, wherein the mobile telephone is fastened to the user or to the vehicle, on or by which the user is transported, with the display screen of the mobile telephone being visible to other road users than the user, and wherein the user performs said traffic signalling by activating the remote activation means so that the mobile telephone performs visual signalling.

21. Method according to claim 20, wherein the mobile telephone is placed in a reversible pocket of a wearable article, such as a garment, a backpack or a belt, which pocket comprises a first flexible pocket side and a second flexible pocket side together forming the pocket, which pocket is furthermore fastened to the article along an attachment line and can be reversed so that an interior of the pocket protrudes from the article with the first side exposed, wherein the pocket is of a size and shape suitable for completely accommodating the mobile telephone, and wherein the first pocket side is at least partly transparent, wherein the mobile phone is placed in the pocket so that the display screen of the mobile phone can be read through the exposed first pocket side, wherein the article is worn by the user, and wherein the mobile telephone performs visual signalling through the transparent first side of the pocket.

* * * * *